May 3, 1955     E. P. HARRIS ET AL     2,707,490
FLEXIBLE TUBING
Filed Aug. 17, 1951
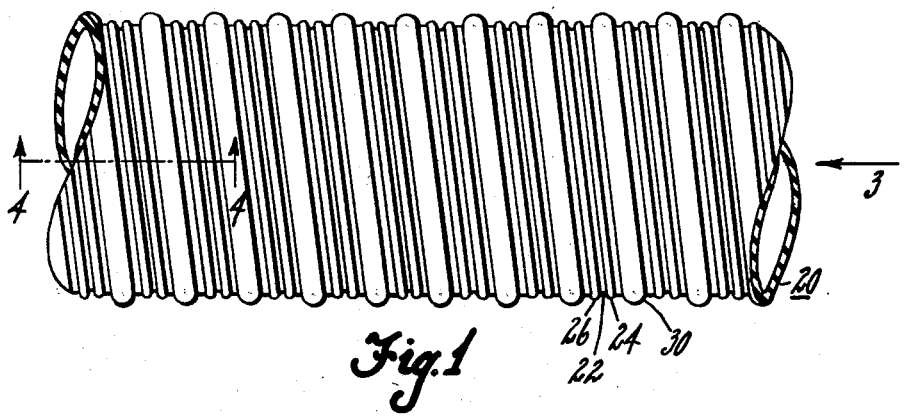
Fig. 1
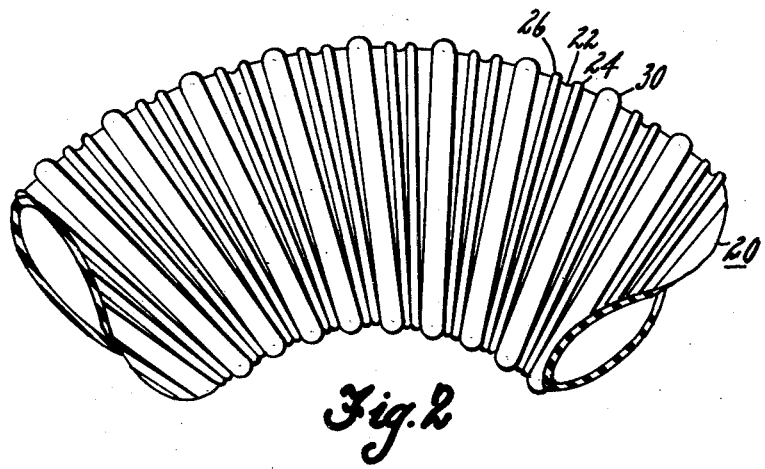
Fig. 2
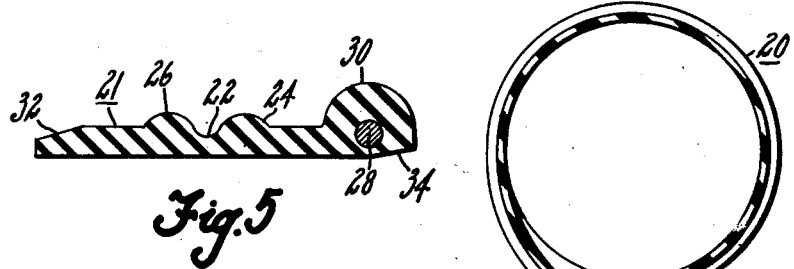
Fig. 5
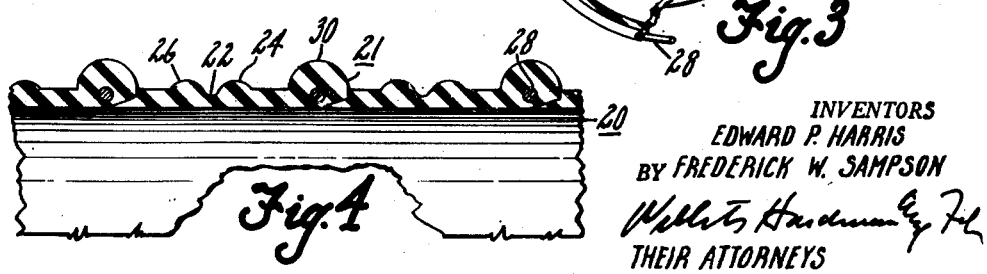
Fig. 3
Fig. 4
INVENTORS
EDWARD P. HARRIS
BY FREDERICK W. SAMPSON
THEIR ATTORNEYS

United States Patent Office 2,707,490
Patented May 3, 1955

2,707,490

FLEXIBLE TUBING

Edward P. Harris and Frederick W. Sampson, Dayton, Ohio, assignors to General Motors Corporation, Detroit, Mich., a corporation of Delaware Application August 17, 1951, Serial No. 242,355

2 Claims. (Cl. 138—56)

This invention relates to flexible tubing and is particularly concerned with flexible tubing formed from rubber-like material and including a reinforcing wire therein.

It is, therefore, the basic object of the invention to provide an integrated rubber-like tube which is highly flexible and strong and which includes a reinforcing wire therein.

Another object of the invention is to provide a tube which may be readily flexed without buckling at the flexed portions thereof and wherein a reinforcing wire is included to maintain the shape of the tube and prevent collapse thereof.

Further objects and advantages of the present invention will be apparent from the following description, reference being had to the accompanying drawing, wherein preferred embodiments of the present invention are clearly shown.

In the drawing:

Fig. 1 is a side view of a portion of the tubing.

Fig. 2 is a view of the tubing shown in Fig. 1 flexed to a curved form.

Fig. 3 is an end view of the tubing shown in Fig. 1, depicting the springy nature of the reinforcing wire which maintains the tube in shape.

Fig. 4 is a fragmentary sectional view of the tubing taken on line 4—4 of Fig. 1.

Fig. 5 is a view in section of the tape used in the manufacture of the tubing.

Tubing of the character herein may be made by the method disclosed in copending application, Serial No. 242,362, filed concurrently herewith.

In this application a method is disclosed for extruding long lengths of ribbon from rubber-like elastomeric material wherein a reinforcing wire is formed into a preset curvature and is passed through the extruding die so that the rubber-like material is coated thereover. This ribbon is then wound helically on a mandrel and is cured or vulcanized for integrating the overlapping portions of the rubber-like tape into a unitary tubular structure. The reinforcing wire also runs helically through the tube for supporting the same and preventing collapse thereof.

The invention here is directed specifically to the configuration of the tubing and to the cross sectional shape of the ribbon used in the formation of the tube whereby the tube is readily flexible even to 90° bends and wherein no collapse of the tube is noted at the flexed portions thereof.

Specifically, tubing of this character may be used for defroster hose, vacuum cleaner hose, ventilating hose and a multitude of other uses wherein relatively large diameter tubing is required. In the past, tubes of this type were formed by wrapping vulcanizable tape material onto a mandrel wherein the reinforcing wire was enveloped in the overlap between adjacent turns of the tape. While this tubing is quite useful, there are many instances where buckling is apparent upon considerable bending of the tubing due to the fact that the tape material between adjacent turns of reinforcing wire is of substantially uniform thickness and, therefore, does not present an easily bendable portion. Furthermore, hose or tubing, made from wrapped tape material, is more difficult to fabricate than is the extruded type as disclosed in the aforementioned copending application.

The uniform bending of the tubing is a very desirable condition, particularly in ventilating and defroster hose wherein the buckling of the inside of the tube causes considerable friction to fluid flow by the creation of eddy currents which cause any definite length of the tubing to have a higher pressure drop therethrough than if said length of tubing is free from buckled portions.

Referring specifically to the drawing, a length of tubing which forms the basis of our invention is shown at 20. This tubing 20 is shown in bent portion in Fig. 2 and it will be noted that a smooth curvature is present at the minor diameter portion of the bend. This is occasioned by the inclusion of a spirally disposed weakened portion 22 as noted in the ribbon 21 shown in Fig. 5. This weakened portion 22 is bounded on either side thereof by increased thickness portions 24 and 26 which form longitudinal ridges on the extruded ribbon. A reinforcing wire 28 is included in a third longitudinally disposed ridge 30. The ridge 30 is formed to completely envelope the reinforcing wire 28 and provide sufficient material therearound to prevent break-through during the formation of the tube. Preferably, the opposed edges of the ribbon 21 are provided with tapered portions 32 and 34 at opposite sides thereof so that when the ribbon 21 is wrapped spirally on a mandrel (not shown) the tapered portions 32 and 34 interfit as shown in Fig. 4 to form a smooth joint between adjacent turns of the ribbon 21 on the mandrel. After curing, the tubing 20 is readily slipped off the mandrel due to the fact that the reinforcing wire 28 of springy material has a tendency to enlarge. This is clearly shown in Fig. 3 wherein a cut-off section at the end of a piece of tubing 20 is shown wherein the end of the wire 28 springs outwardly against the restraint of the rubber-like material of the tube. Thus the springy reinforcing wire 28 tends to enlarge the tubing circumferentially on the mandrel whereby it is easy to slip the same therefrom. This outward springing tendency of the reinforcing wire 28 has still another function, namely, that of maintaining the tube in cylindrical form at all times.

The valley portion 22 formed in the ribbon 21 is an important part of our invention. This valley portion 22 is of slightly less thickness than the main thickness of the ribbon 21 and presents a spiral groove in the finished tubing which is weaker than the remainder of the tube and is bounded on either side by increased thicknesses of material so that when a bend in the tubing occurs, the excess material tends to flow into the valley portion 22. This results in a smooth bend with no buckling at the minor diameter portion of the bend and likewise presents a readily stretchable part at the major diameter portion of the bend whereby the inner surface of the bent tubing is relatively smooth and presents little restriction to air flow therethrough.

It may be said here that various designs of tubing have been made and that when the valley portion is not substantially centrally located of the ribbon 21 and when the increased thickened ridge portions 24 and 26 bounding the valley 22 are omitted, a smooth bend is not forthcoming since the buckling tendency prevails. In other words, the cross sectional design of the ribbon 21 as used to form the tube 20 is of considerable importance to the formation of a satisfactory bendable tube.

While the embodiments of the present invention as herein disclosed, constitute preferred forms, it is to be understood that other forms might be adopted.

What is claimed is as follows:

1. In a flexible elastomeric tube made from spirally wrapped elastomeric tape, said tube having a substantially smooth internal surface, the combination comprising; at least three spirally disposed and laterally spaced rib enlargements continuously extending along the outer surface of said tube wherein one of said enlargements is larger than the others, a spirally disposed reinforcing member embedded in said one rib enlargement for strengthening the tube against inward collapse, said other enlargements being equally spaced between adjacent turns of said one enlargement and spaced adjacent each other, a continuously extending spirally disposed valley portion between said other enlargements having a depth sufficient to form a spirally weakened portion in the tube wall with the thickness of the tube wall at said spirally weakened portion being less than the thickness of other portions of the tube wall, said valley portion being adapted to improve the bendability of said tube without substantial buckling.

2. In a flexible elastomeric tube having a substantially smooth internal surface and made from spirally wrapped elastomeric tape, the combination comprising; at least three spirally disposed rib enlargements continuously extending along the outer surface of said tube wherein one of said ribs is of larger dimension than others, a spirally disposed reinforcing member embedded in said larger rib, said reinforcing member before being embedded in said rib having a diameter of convolution greater than the diameter of said tube for strengthening said tube against inward collapse, said other ribs being equally spaced between adjacent turns of said one enlarged rib and spaced adjacent to each other, a continuous spirally extending weakened valley portion between said other ribs having a depth sufficient to form a spirally weakened portion in the tube wall, the thickness of the tube wall at said spirally weakened portion is less than the thickness of other portions of the wall and said valley portion being adapted to permit said tube to be readily bendable without substantial buckling.

References Cited in the file of this patent
UNITED STATES PATENTS

| | | |
|---|---|---|
| 375,877 | Judson | Jan. 3, 1888 |
| 2,406,838 | Kepler | Sept. 3, 1946 |
| 2,452,047 | Hamblin | Oct. 26, 1948 |
| 2,524,522 | Gilmore et al. | Oct. 3, 1950 |
| 2,570,259 | McKinley | Oct. 9, 1951 |
| 2,622,623 | Michaudet | Dec. 23, 1952 |

FOREIGN PATENTS

| | | |
|---|---|---|
| 846,632 | France | Sept. 21, 1939 |